000# United States Patent Office 3,396,781
Patented Aug. 13, 1968

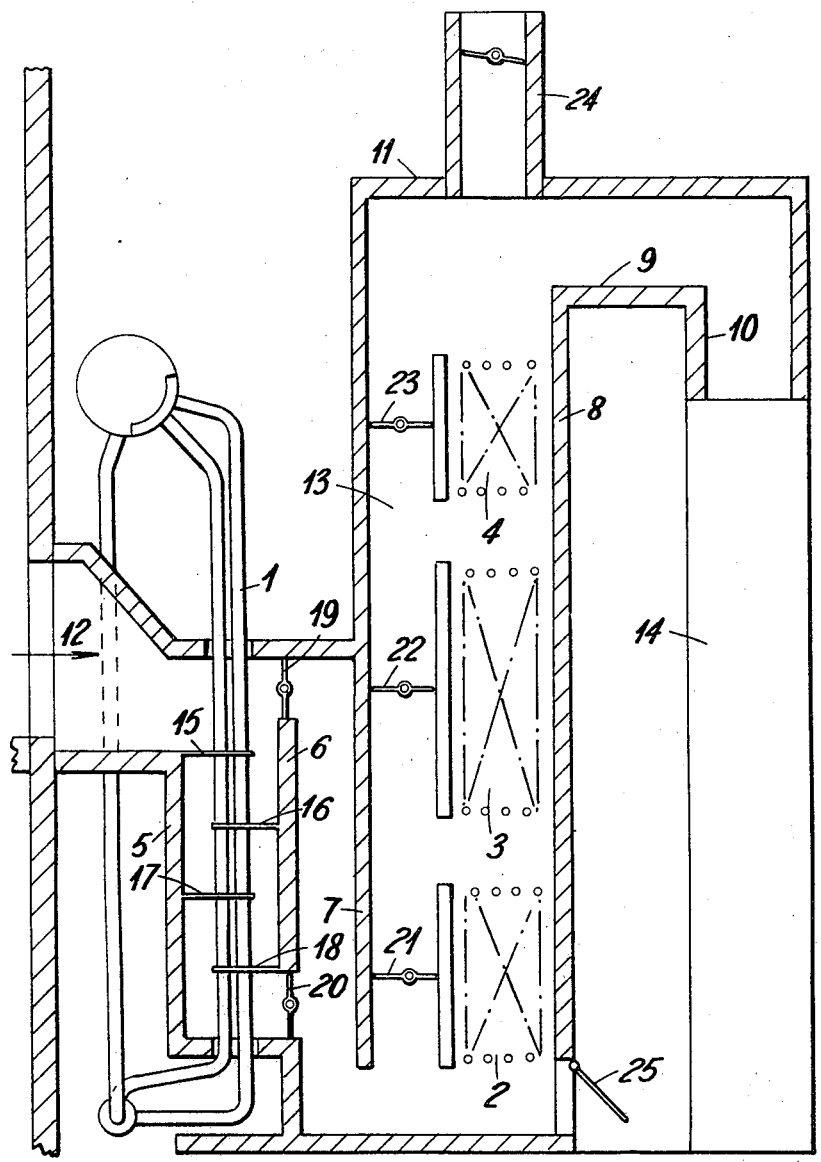

3,396,781
PROCESS AND APPARATUS FOR THE
RECOVERY OF WASTE HEAT
Henry John Whetmore, London, England, assignor to
Humphreys & Glasgow Limited, London, England, a
British company
Filed Dec. 5, 1966, Ser. No. 599,278
Claims priority, application Great Britain, Dec. 8, 1965,
52,086/65
1 Claim. (Cl. 165—103)

ABSTRACT OF THE DISCLOSURE

The invention is concerned with a process and apparatus for heat recovery applicable to the continuous reforming of light petroleum hydrocarbons with steam. The flue gases from the furnace used in the reforming processes are passed through a duct having alternate vertical and horizontal passages, the heat exchange operations being effected in at least two separate vertical passages of the duct. Adjustable by-pass passages for the heat exchangers are preferably provided within the duct and the duct also preferably has at least one additional inlet and outlet, each being preferably situated in one of the horizontal passages.

---

This invention is concerned with the recovery of waste heat from flue gases in a process of continuous catalytic steam reforming of light petroleum hydrocarbons in externally heated tubes.

In such a process the catalyst tubes into which the reactants are passed are heated in a furnace to a high temperature level, generally of the order of 900° C., and a considerable amount of high grade sensible heat is available in the flue gases leaving the furnaces.

It is accepted practice to apply this heat to steam raising for process use, and may be for power generation, and to preheating of the reactants being passed to the catalyst tubes.

Usually this is effected by means of an arrangement, in a horizontal duct, of a succession of tubular heat exchangers for steam raising and for preheating the reactants, over which the flue gases pass in their passage from end to end of the duct. Adjustable dampers are known to be used to vary the heat distribution to the various components of the arrangement.

The method and apparatus specifically described hereafter effects an improved operating flexibility in this utilisation of waste heat and its allocation to the different heat exchangers, and provides improved protection for the heat exchangers particularly in emergency conditions.

According to the present invention there is provided a process for the continuous reforming of light petroleum hydrocarbons with steam wherein the flue gases from the furnace used for the reforming step of the process are used for steam raising and for preheating the reactants for the reforming step of the process, the process including the step of passing the flue gases through a duct or chamber in which the heat exchangers for steam raising and preheating are situated, the flue gases being conducted through the duct or chamber along a path having alternate vertical and horizontal parts, the heat exchangers being situated in at least two separate vertical parts of the flue gas path, at least part of the steam and/or preheated reactants derived from said heat exchangers, being thereafter used in the reforming step of the process.

The present invention further provides a heat recovery apparatus for use in a process for the continuous reforming of light petroleum hydrocarbons with steam comprising a duct or chamber suitable for conducting the passage therethrough of flue gases from the furnace used in the reforming process and containing heat exchangers for steam raising, for preheating of the reactants for the reforming process, and for heating the combustion air for the furnace used in the reforming process, the duct or chamber having alternate vertical and horizontal passages and the heat exchangers being situated in at least two of said vertical passages.

Also included within the scope of the invention are combustible gases whenever prepared from light petroleum hydrocarbons by a reforming process in accordance with the invention.

Preferably the flow of the flue gases is directed so that it alternates at least thrice horizontally and vertically.

Additionally improvement in the selective distribution of the waste heat to the separate heat exchanger units is facilitated by provision of adjustable dampers or baffles set at selected positions in the gas path.

The process and apparatus of the invention will now be described with reference to the accompanying drawing which is a diagrammatic representation of the apparatus. The apparatus comprises a vertical tube waste-heat boiler 1, secondary and primary heaters 2,3 for the hydrocarbon reactant, and a superheater 4 for the process steam. The heat exchangers 2,3 and 4 comprise horizontal tubes arranged as shown in the drawing.

The walls 5, 6, 7, 8, 9 and 10, and the outer wall 11 of the apparatus direct the hot flue gases from the furnace (not shown). The flue gases enter the apparatus horizontally via the duct 12, and flow firstly vertically down over the tubes of the boiler 1, and then again horizontally towards the passage 13 in which the heat exchangers 2, 3 and 4 are supported spaced vertically above one another.

After passing through passage 13 the gases are again deflected horizontally between walls 9 and 11 and then vertically once more downwards through the tubes of the combustion air heater 14. Thence the gases pass to a stack which is not shown in the drawing.

The fixed baffles 15, 16, 17 and 18 impose an "in cross" flow on the gases in their downward passage over the tubes of the boiler 1, while the setting of the adjustable baffles 19 and 20 determines the proportion of the hot gases passed over the tubes to that deflected instead downwards between the walls 6 and 7. This arrangement thus provides a control over steam raising.

In a similar manner the setting of the adjustable baffles 21, 22 and 23 controls the transfer and distribution of heat to the reactants passing through the heat exchangers 2, 3 and 4.

The valved vent stack 24 may be used for reducing the amount of heat input to the combustion air heater 14 during normal operation, for instance during a routine shut-down. The essential purpose of the stack 24 is however for emergency use, such as in the event of a power failure. The stack then provides a means for drawing air, which may be introduced via the vent doors 25, over the tube bundles of the heat exchangers 2, 3 and 4 to protect them from overheating.

The air vent doors 25 also ensure that when, in emergency, the furnace vent (not shown) is opened a positive circulation results. This in turn creates a negative pressure in the furnace, and the cold air induced through the vent doors 25 has a cooling effect within the furnace.

Also in the event of failure of the hydrocarbon feedstock supply to the reformer tubes, and a resulting increase in the temperature of the flue gases leaving the furnace via the duct 12, these gases may be cooled down by opening the vent doors 25 in order to protect the heat exchangers 2, 3, 4 and 14 from overheating.

During start-up of the plant, when there is a heavy steam demand, the adjustable baffle 19 would be closed and the baffle 20 open so that all the hot flue gases are constrained to pass over the tubes of the boiler 1.

The design specifically described hereinbefore has the merit of combining technical advantages with economic ones, the latter being essentially the appreciable saving in space required for a particular duty and the elimination of external by-pass passages which are sometimes incorporated in the usual horizontal design to obtain some improvement.

Previous designs, which employed a horizontal layout for the same duty, incorporated a water tube boiler with horizontal or inclined tubes which necessitated forced circulation (by means of a pump) for the boiler water in order to obtain adequately fast movement. In spite of this there was endless trouble with hot spots resulting in tube failure. Good circulation of hot gases all over the tubes was not obtained.

The arrangement of the specific apparatus described hereinbefore employs a vertical tube boiler, with resulting good natural circulation; "in cross" passage of hot gases over the tubes is effective and easily arranged and as a result efficient boiler performance is obtained with elimination of "hot spots."

Because of the vertical tube arrangement the effect of the baffles 19 and 20 is more efficient in deflecting the hot gases over the tubes which is a big advantage for extra steam raising when required, for instance during start-up. Thus flexibility is conferred without affecting the good "in cross" flow of the heating gases over the tubes.

In the case of the other heat exchangers 2, 3 and 4 they are, because of their purpose, best arranged with their tubes horizontal.

If these heat exchangers are set in a horizontal flue duct, and particularly when provided with a baffling arrangement, the effect on an exchanger when the baffles are set to give partial by-passing of the preceding exchanger is to deflect hot by-passed heating gas over tube ends at a position on the side near the baffle, while cooler gases which had traversed the preceding exchanger are deflected to tube ends at a position on the far side from the baffle. This causes severe damage and persistent failures at tube ends.

The position of the vent stack 24 above two vertical ducts containing heat exchangers makes it much more effective for its purposes than if the ducts were horizontal.

In addition the safety features conferred by the design in emergency conditions have been mentioned hereinbefore.

It will be understood that the scope of the present invention is not limited to the precise details of the specific process and apparatus described herein but includes obvious variations of the general arrangement described.

I claim:
1. A heat recovery apparatus suitable for use in a process for the continuous reforming of light petroleum hydrocarbons with steam said apparatus comprising in order of its connected parts:
  (a) an inlet duct for flue gases from the furnace used in the reforming process, said duct being connected to—
  (b) a downwardly directed passage containing the tubes of a vertical tube water boiler adapted to produce steam from heat derived from the flue gases, there being situated adjacent said downwardly directed passage—
  (c) a by-pass passage capable of conducting the flue gases around and out of contact with the tubes of the water boiler;
  (d) a horizontal passage having a closeable opening capable of permitting inlet of air into the horizontal passage;
  (e) an upwardly directed vertical passage containing heat exchange units having horizontal heat exchange tubes for heating the reactants for the reforming process and for super-heating steam, each of said heat exchange units being provided with a by-pass passage having a baffle which is capable for regulating the flow of gas through the heat exchange unit;
  (f) a horizontal passage having a closeable vent stack to atmosphere;
  (g) a downwardly directed vertical passage divided into tubes said tubes being adapted to extract heat from the flue gases to heat combustion air used in the heating furnace used for the reforming process; and
  (h) a flue gas outlet.

References Cited
UNITED STATES PATENTS

| | | | |
|---|---|---|---|
| 2,625,470 | 1/1953 | Roberts | 48—213 |
| 2,832,571 | 4/1958 | Baver | 165—103 |
| 3,194,214 | 7/1965 | Frendberg | 165—145 |

ROBERT A. O'LEARY, *Primary Examiner.*

C. SUKALO, *Assistant Examiner.*